Patented Apr. 30, 1946

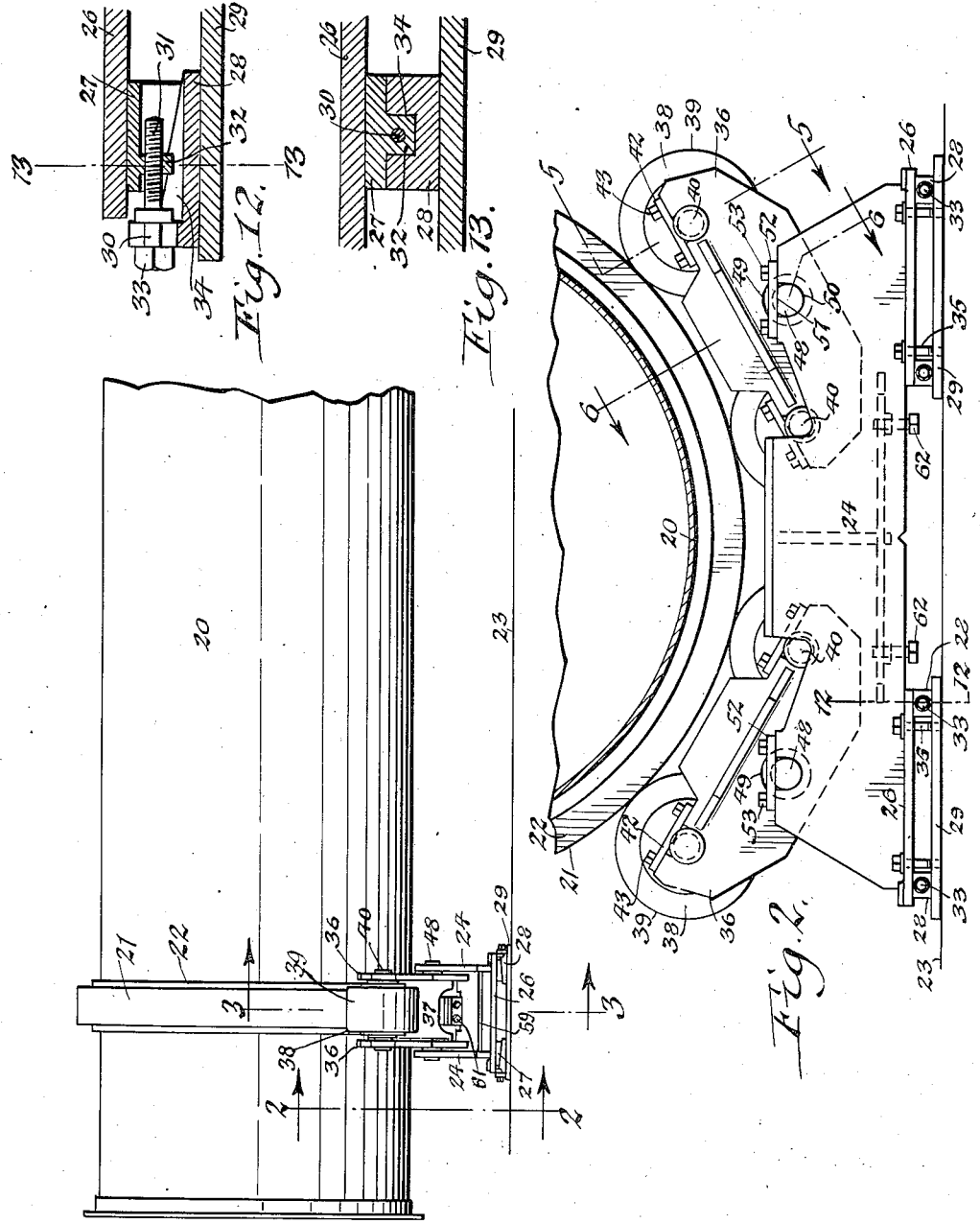

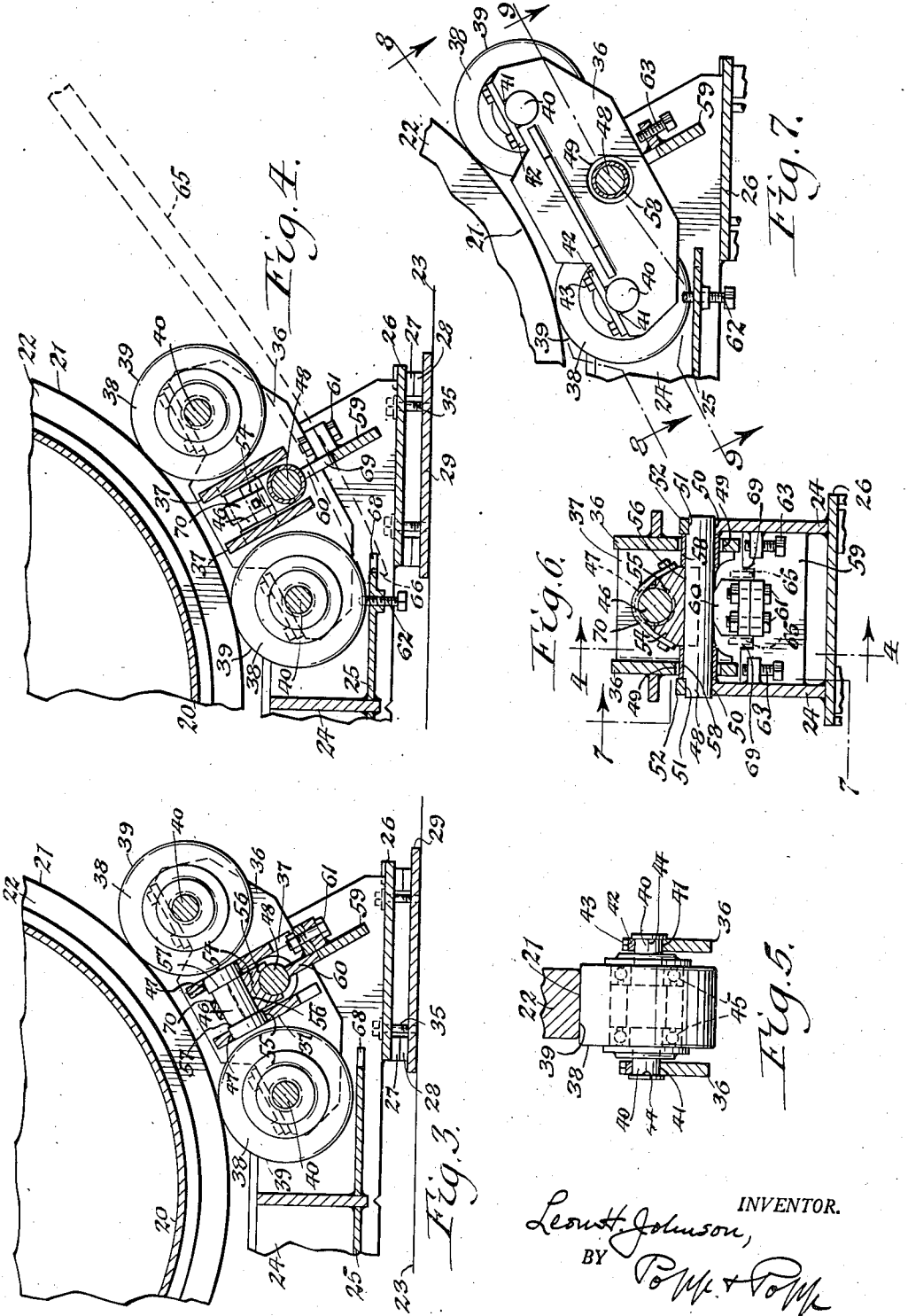

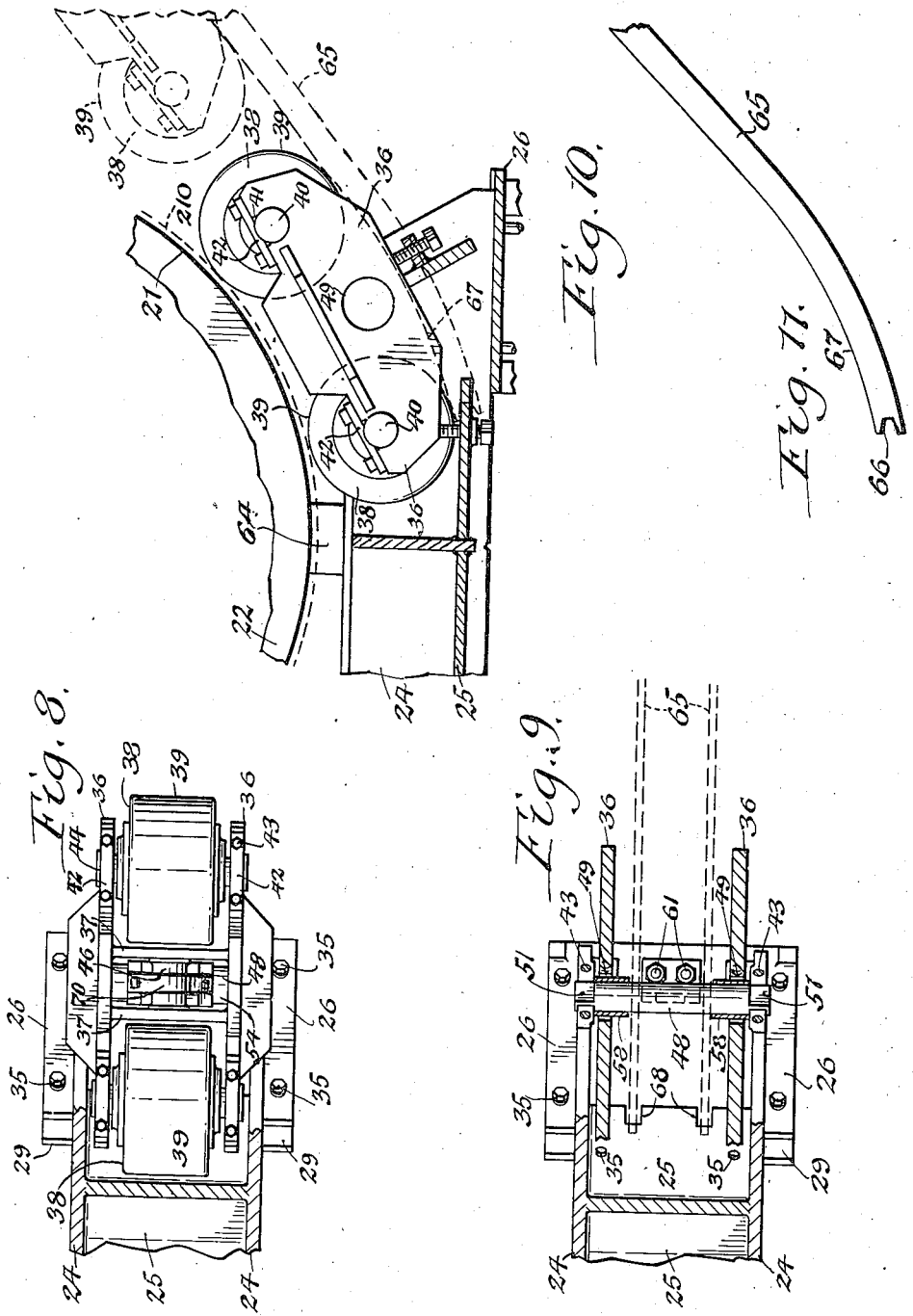

2,399,189

UNITED STATES PATENT OFFICE 2,399,189

ROLLER MOUNTING FOR SHELLS

Leon H. Johnson, Warren, Pa.

Application May 15, 1945, Serial No. 593,942

12 Claims. (Cl. 308—203)

This invention relates to a roller mounting for supporting the rotatable cylindrical shells, drums or vessels forming a part of kilns, dryers, grinders, mixers and similar equipment in which the cylindrical shell is provided on its periphery with bearing surfaces usually comprising annular tires or riding rings running on a plurality of supporting rollers which are mounted on a relatively stationary base.

In installations of this character the typical equipment usually comprises tires or riding rings which are secured in spaced relation to the exterior of the shell and each of these tires or rings running on two or four rollers which are arranged on opposite sides of the longitudinal center of the shell and each of these rollers being mounted on a frame or base.

The means heretofore employed for this purpose are unsatisfactory in that it is difficult to maintain the same in a position which will provide a uniform contact of the several supporting rollers with the peripheral bearing surfaces of the tires on the shell and the same are also so organized that the rollers are incapable of being readily adjusted relative to the bearing surfaces on the shell, thereby involving excessive wear and considerable maintenance cost.

It is the object of this invention to provide improved means for mounting the supporting rollers, which means are capable of automatic adjustment so as to provide a uniform bearing between the supporting rollers and the shell and to permit such adjustment to be effected easily and expeditiously and thus maintain the roller mounting in the best operative condition without involving undue cost.

In the accompanying drawings:

Fig. 1 is a fragmentary side elevation showing an approved form of my invention used in connection with a cylindrical shell or drum which may be a part of a kiln, dryer, grinder, mixer or similar equipment.

Figs. 2 and 3 are fragmentary cross sections, on an enlarged scale, taken on lines 2—2 and 3—3, respectively, in Fig. 1.

Fig. 4 is a view similar to Figures 2 and 3 but taken on line 4—4, Fig. 6.

Figs. 5 and 6 are fragmentary vertical sections, taken on the correspondingly numbered lines in Fig. 2.

Fig. 7 is a vertical section taken on line 7—7, Fig. 6.

Figs. 8 and 9 are horizontal sections taken on the correspondingly numbered lines in Fig. 7.

Fig. 10 is a fragmentary vertical transverse section, similar to Fig. 7, but showing the relative position of the parts during the operation of raising the cylindrical shell of the apparatus and removing one of the roller units from between the supporting base and the shell for the purpose of inspecting, repairing or otherwise servicing the respective roller unit.

Fig. 11 is a side elevation of one of the rails or guide bars forming part of the track or runway upon which the roller unit embodying this invention may be moved into and out of its operative position between the shell and tire of this apparatus and the supporting base upon which the same is mounted.

Fig. 12 is a fragmentary longitudinal section of one of the wedge adjusting devices for leveling a base of the apparatus, this section being on an enlarged scale and taken on line 12—12, Fig. 2.

Fig. 13 is a vertical transverse section taken on line 13—13, Fig. 12.

In the following description, similar reference characters indicate like parts in the several figures of the drawings:

The numeral 20 represents the cylindrical shell or drum of a kiln, dryer, grinder, mixer or the like which forms part of the apparatus which is adapted to be supported by the roller mounting which embodies this invention, which shell may be rotated by any suitable means and arranged to rotate either about a horizontal axis or a more or less inclined axis, depending upon the character of the apparatus in which this shell is used.

At intervals the shell is provided on its exterior with a cylindrical bearing surface 21 which is preferably formed on the periphery of a supporting tire or riding ring 22 which is secured to the outer side of the shell or drum in any suitable manner.

In utilizing this invention a plurality of assemblies embodying the same are arranged between the underside of this shell and the foundation or floor 23 below the same, these assemblies being arranged at different points throughout the length of the shell and the number used being variable and depending upon the length of the shell and the character of the work which is done by the apparatus. When the shell is comparatively short, two complete assemblies are employed for supporting the shell adjacent to opposite ends of the same but when the shell is comparatively long a greater number of such assemblies are required to properly support the load which is imposed upon the shell.

In general each of these assemblies comprises a relatively stationary base which is mounted on the foundation transversely below the shell and upon the opposite ends of this base are mounted two roller units which provide a rolling support for the shell on transversely opposite sides of its longitudinal center.

Although this base may be of any suitable construction the same preferably comprises two upright side plates 24, 24 arranged crosswise of the axis of the shell or drum, a bottom plate 25 connecting the central lower parts of the side plates and two horizontal foot plates 26 connecting the lower parts of the side plates at opposite ends of the same.

In the preferred construction means are provided whereby this base may be adjusted vertically at its opposite ends to that the roller units embodying this invention may be located in the required position to cooperate properly with the respective tire or riding ring on the shell. Various means may be employed for thus adjusting the base but those shown in Figs. 1–4 are preferred and comprise a plurality of pairs of upper and lower wedges 27, 28, the members of each pair having their opposing sides inclined and engaging each other and the upper member of each pair being secured to the underside of a foot plate 26 forming part of the base and the lower wedge being slidably mounted on a sole plate 29 which is secured to the foundation so that upon moving the lower wedge of each pair lengthwise relative to its companion upper wedge, the respective part of the base will be raised or lowered depending upon the direction in which the lower wedge is moved.

The longitudinal movement of each lower wedge 28 may be effected in various ways but preferably by means of an adjusting screw 30 which is mounted on the lower wedge 28 so as to be capable of rotation but held against longitudinal movement relative thereto and has its threaded inner end 31 engaging with a screw nut 32 on the companion upper wedge, as shown in Fig. 11. Turning of the adjusting screw is effected by applying a wrench to the flat sided head 33 at the outer end of this screw. The pair of wedges of each adjusting device are guided relatively to each other by sliding the nut 32 of the upper wedge 27 in a groove 34 in the lower wedge, as shown in Figs. 12 and 13.

After the base has been adjusted into the desired position by operation of the several wedge devices, the base is rigidly held in position upon the several sole plates 29 by means of clamping screws 35 which connect the foot plates of the base with the sole plates, it being understood that these sole plates are rigidly mounted on the foundation.

The roller units which are arranged at opposite ends of each base and cooperate with the supporting tire or riding ring on the adjacent part of the shell are identical in construction and each of these units comprises a cradle pivotally mounted on the base and capable of rocking in planes crosswise and lengthwise of the axis of the shell, and a pair of roller members which are pivotally supported on said cradle on opposite sides of its axis and each of these roller members being pivoted on the cradle so as to be capable of turning about an axis arranged parallel with the axis of the shell.

The cradle of each of these rolling units is preferably constructed as follows:

The numerals 36, 36 represent two side bars or plates which are arranged parallel and in spaced relation from each other and 37, 37 represents two cross bars or plates which are arranged parallel and spaced apart between the side bars and connected at their opposite ends with the central parts of these bars or plates.

The roller members of the roller unit comprise two supporting rollers 38 which are pivotally mounted on the inner and outer ends respectively of the cradle and each is provided on its periphery with a cylindrical surface 39 which engages with the bearing surface 21 of the respective tire or riding ring. Although various means may be employed for pivotally mounting these supporting rollers on the cradle, those shown in the drawings are preferred and comprise horizontal pintles or axles 40, each of which extends across the space between the side plates or bars of the cradle and has its opposite ends seated in upwardly opening notches 41 formed in the corresponding parts of the cradle side bars at one end of the same. This axle is held in these notches by means of retaining plates 42 extending across the upper open ends of these notches and engaging the upper sides of the end portions of these axles and secured to the adjacent upper edge portions of the cradle side bars by means of bolts 43, as shown in Figs. 2, 7, 8 and 10. Longitudinal movement of each of these axles on the cradle is prevented by means of inwardly facing shoulders 44 formed on each of these axles adjacent to the ends thereof and engaging with the outer sides of the cradle side bars and the respective retaining plates 42, as best shown in Fig. 5. For the purpose of enabling the supporting rollers to turn freely on the axles 40 and with a minimum amount of friction, each of these rollers is mounted on its respective axle by means of roller bearings 45 which may be of any well known or suitable construction.

Means are provided whereby the cradle is capable of automatically adjusting itself so that the peripheral surfaces of the supporting rollers and the respective tire will always engage each other throughout their full width. For this purpose a universal joint or connection is provided which is interposed between each of the cradles and one end of the supporting base, which universal joint permits the respective cradle to not only rock in a plane transversely of the axis about which the shell rotates but also permits the same to rock lengthwise thereof, which universal joint embodies this invention and is preferably constructed as follows:

The numeral 46 represents an upper pivot pin or trunnion which is arranged transversely relative to the axis of the rotatable shell 20 and extends across the upper part of the space between the cradle cross bars and has its oppositie ends seated in corresponding openings 47, formed in the adjacent parts of these cradle cross bars, as best shown in Fig. 3. The numeral 48 represents a lower pivot pin or trunnion which is arranged lengthwise of the axis of the rotatable shell 20 and extends across the lower central parts of the cradle side bars immediately below the respective upper pivot pin or trunnion and at right angles thereto and has its opposite ends extending through openings 49, 49 in the adjacent parts of the cradle side bars and its oppositie extremities supported on the adjacent parts of the side plates 24, 24 of the supporting base, as best shown in Figs. 6 and 7. The lower pivot pin or trunnion 48 is preferably held against turning on the base side plates 24 and this is accomplished by seating the rounded undersides of the end portions of this trunnion with the rounded lower ends of the notches 50 formed in the upper edges of the base side plates and providing the upper sides of these end portions with flat faces 51 which are engaged by retaining plates 52 secured to the upper edges of the base side plates by means of screws 53, as shown in Figs. 2 and 6.

The numeral 54 represents a universal bearing block which is interposed between the upper and lower trunnions and the side and cross bars of the cradle and is provided on its upper side with a semi-cylindrical or half bearing 55 which faces upwardly and engages with the rounded underside of the upper trunnion 46 and the lower part of this bearing block is provided with a downwardly facing semi-cylindrical or half bearing 56 the axis of which is arranged at right angles to the upper half bearing 55 and engages with the upper rounded central bearing surface of the lower trunnion 48, as best shown in Figs. 3 and 6. By these means the cradle is permitted to rock in an upright plane extending lengthwise of the axis of the shell by rotation of the upper trunnion 46 on the upper side of this universal bearing block and the cradle is also free to rock in a plane perpendicular to the axis of the shell by turning of the universal bearing block with its underside on the lower trunnion 48, thereby permitting the cradle to move freely in the aforementioned planes. As a result the supporting rollers at opposite ends of the cradle are able to automatically shift their position as much as may be necessary for adapting their cylindrical bearing surfaces 39 relative to the cylindrical bearing surface 21 of the respective tire and cause these cooperating surfaces to engage fully with each other throughout the width thereof.

Due to this organization each of the bearing rollers supports the maximum part of the load which it is capable of sustaining and causes the bearing pressure on the cooperating surfaces of the supporting rollers and the respective shell tire to be distributed uniformly, thereby maintaining these members in their best operative condition for a much longer period and prolonging the time in which repairing or replacement of the same becomes necessary.

When the several parts of the cradle, supporting base and the universal joint between the cradle and base are assembled, the universal bearing block is confined against appreciable movement in a direction crosswise of the axis of the shell by confining the universal bearing block between the cross bars of the cradle, as shown in Fig. 3. The upper trunnion 46 is held against movement in the direction of its axis by means of shoulders 57, 57 formed on this trunnion adjacent to opposite ends thereof and engaging with opposite sides of the bearing block, as shown in Fig. 3, and the bearing block is also maintained in its central position and against movement in a direction lengthwise of the axis of the lower trunnion 48 by means of spacing sleeves 58 which surround the lower trunnion and have their inner ends engaging with opposite ends of the bearing block and their outer ends engaging with the inner sides of the base side plates 24, as best shown in Figs. 4 and 6.

In order to prevent the central part of the lower trunnion 48 from being bent downwardly by the load which is imposed upon the same, reinforcing means are provided consisting of a sustaining web having a lower section 59 which is arranged between the two side plates 24 of the base and has its opposite ends rigidly connected therewith and an upper section 60 which engages with the central part of the underside of the lower trunnion and is detachably connected with the lower web section 59 by means of bolts 61, as shown in Figs. 3, 4 and 6. By these means this reinforcing web forms an auxiliary support for the lower trunnion between the opposite ends of the latter and thus prevents the same from being deflected downwardly by the heavy weight which presses against the upper side of the same and thereby maintains this unit of the roller mounting in good operative condition.

For the purpose of holding the upper trunnion 46 and the bearing block 54 in an assembled position when the lower trunnion 48 is removed a strap or yoke 70 is employed which engages with the upper side of the upper trunnion and has its opposite ends connected with the adjacent parts of the bearing block, as shown in Figs. 3, 4, 6 and 8.

When the rollers, bearings, axles, trunnions and the universal bearing block become worn to such an extent that replacement or repairs of any of these members becomes desirable or necessary the shell or drum is temporarily raised a sufficient distance to take the weight of the shell and its associated parts from the supporting rollers, the cradle and the universal bearing block and parts connected therewith in order to permit this roller unit to be conveniently removed from between the shell and the base and also replaced after the same have been serviced.

The means for effecting such temporary raising of the shell for releasing the rolling mounting and the method of using the same include two lifting jack screws 62 which work in threaded openings in an inner part of the base, such as the bottom plate of the supporting base and are adapted to engage with the inner parts of the underside of the two side bars 36, 36 of the cradle, and two outer lifting jack screws 63 which work in threaded openings formed in lugs on an outer part of the base, such as the side plates 24 and the web section 59 and adapted to engage with the underside of the outer part of the two side bars 36, 36 of the cradle. The inner and outer pairs of jack screws 62, 63 are arranged on opposite sides of the axis of the lower cradle trunnion 48. While the apparatus is in operation the inner and outer pairs of jack screws 62, 63 are adjusted so that their upper ends are disengaged from the undersides of the cradle side bars 36, as shown in Fig. 7, thereby permitting this cradle to rock freely in any direction and permit its supporting rollers 38, 38 to automatically adapt this peripheral bearing surface 39 to the peripheral bearing surface 21 of the tire on the shell.

When, however, it is desired to lift the shell temporarily from these supporting rollers preparatory to withdrawing the roller supporting unit from between the shell and the base, the inner and outer sets of jack screws 62, 63 are first adjusted to that they engage the undersides of the inner and outer parts of the cradle side bars and lift the cradle so that the peripheral bearing surface 21 of the tire is shifted from the lower operative position shown by dotted lines 210 in Fig. 10 to the elevated inoperative position shown by full lines 21 in the same figure. At this time the tire is disengaged from the supporting rollers 38 and the roller units are relieved from the weight of the shell and its associated parts. When the shell has been thus lifted the same is maintained in this elevated position by any suitable means, for example by means of a supporting block 64 which is temporarily placed between the underside of the tire and the upper side of the supporting base, as shown in Fig. 10.

While the cradle is thus lifted by the jack screws 62, 63 the upper section 60 of the reinforcing web is detached from the companion lower section 59, the retaining plates 52 are removed from the side plates 24 of the base and the lower trunnion 48 is detached from the side plates of the base, at which time the universal bearing block is carried by the strap 70. The jack screws 62, 63 are now turned so as to lower the cradle and disengage the supporting rollers 38 from the undersides of the shell tire, as shown in Fig. 10, after which the cradle and the parts mounted thereon may be moved laterally out of the space between the shell and the supporting base to permit of more conveniently dismantling this unit and replacing or repairing any parts which may have become worn unduly, such as the upper trunnion, the supporting rollers and the bearings whereby the same are journaled on the axles 40.

For the purpose of facilitating the removal of the cradle and the parts associated therewith from between the shell and the base and the restoration of the same, after being serviced, to the proper position between the shell and base, preparatory to again lowering the tire of the shell onto the supporting rollers a temporary track or runway is provided which preferably comprises two rails or guide bars 65 which are inserted in the space between the lower parts of the cradle side bars and the base side plates on opposite sides of the upper section 60 of the reinforcing web, as shown by dotted lines in Figs. 4 and 6. At its inner or front end each of these rails is provided with a notch or fork 66 which is adapted to engage with the adjacent outer edge of the bottom plate 25 of the base and at a point outwardly from this notch or fork each of these rail bars is adapted to rest on the upper side of the lower section 59 of the reinforcing web, as shown in Figs. 4 and 6. These rails are placed in this position while the cradle and the supporting rollers are elevated by the jack screws 62, 63 and after these rails are thus placed the jack screws are turned so as to lower the cradle and permit the supporting rollers to rest upon the upper sides of these rails, as shown in Fig. 10. Thereafter the cradle may be moved outwardly by running the supporting rollers on the rails as a track or runway from the position shown by full lines in Fig. 10 to the position shown by dotted lines in the same figure, and after the roller unit has been serviced these rail bars are utilized for re-assembling the rolling unit with the supporting base preparatory to lowering the shell and engaging its tire with the periphery of the supporting rollers for resuming the normal operation of the apparatus. Before, however, lowering the shell and its tire on the supporting rollers, the runway bars or rails are moved out of engagement from the supporting base and the rollers of the rolling unit.

In order to avoid the necessity of lifting the shell and its tire an undue extent preparatory to removing the rolling unit for servicing purposes and restoring the same into its operative position, each of the rail or track bars has its inner part curved, as shown at 67, about an axis which is concentric with the axis of the shell and its tire in the elevated position thereof, or substantially so, whereby the path of movement of the roller unit, as it is withdrawn from between the shell and tire and the base and reinserted therebetween, is practically concentric and therefore presents a space which is of uniform height for the passage of the rolling unit into and out of its operative position and thus avoiding the expenditure of unnecessary labor or disarranging the shell an objectionable extent relative to other parts with which the same is associated during this servicing operation.

For the purpose of retaining the rails or guide bars 66 in the proper position while the rollers 38 are running over the same each end of the base bottom 25 is provided with notches 68 which receive the front ends of these rails and the lower section 59 of each reinforcing web is provided with notches 69 which receive the intermediate parts of the rails, thereby holding the latter against side movement while being used.

After such adjustments, replacements or repairs have been made these several parts are again re-assembled in an order reverse of that just described.

The construction of the roller unit embodying this invention permits of properly supporting the rotary shells or drums of an apparatus of the character described in a manner which provides a uniform support for the shell or drum and the parts connected therewith throughout the length of the apparatus due to the maintenance of a full contact over the entire width of the cooperating bearing surfaces between the tires and the peripheries of the supporting rollers, thereby reducing the wear on these surfaces to a minimum and enabling the apparatus to be operated for much longer periods than has been possible heretofore before servicing the same to take care of any wear which has taken place.

Moreover, the construction of the several members of this roller unit is such that when servicing is required this can be done easily and expeditiously, thereby reducing interruption in the operation of the apparatus to a minimum for this purpose and effecting a considerable economy in maintaining the same in an operative condition.

Furthermore, these improved means for mounting the roller supporting cradles on the base permit each roller unit to self-align itself relative to the respective part of the rotary shell which it supports and thus compensate for any differences in the character of the contact between the shell and the several roller units, thereby avoiding the necessity of making the cylindrical shell and the several roller units extremely accurate.

I claim as my invention:

1. A mounting for a rotary shell having a peripheral bearing surface, comprising a pair of bearing rollers spaced circumferentially and engaging said bearing surface, a cradle upon opposite ends of which said bearing rollers are journaled, a normally stationary supporting base, a universal joint which is interposed between said cradle and base, each of said rollers being mounted on an axle, said cradle including two side plates arranged on opposite sides of said rollers and supporting opposite ends of said axles and spaced bridge plates arranged between said rollers and connecting the side plates, and said universal joint including a lower longitudinal pivot pin mounted on said base, an upper cross pin supported at its opposite ends on said bridge plates, and a universal bearing block arranged between said bridge plates and having a longitudinal bearing on its underside which engages the upper side of said lower pivot pin and a transverse bearing on its upper side which engages with the underside of said upper pivot pin.

2. A mounting for a rotary shell having a peripheral bearing surface, comprising a pair of bearing rollers spaced circumferentially and engaging said bearing surface, a cradle upon opposite ends of which said bearing rollers are journaled, a normally stationary supporting base, a universal joint which is interposed between said cradle and base and which includes a lower pivot pin arranged on the base parallel with the axis of said shell, an upper pivot pin arranged on said cradle transversely of the axis of said shell, a universal bearing block provided on its underside with a lower half-bearing the axis of which is arranged parallel with the axis of the shell and engages the upper side of said lower pin and also provided on its upper side with an upper half-bearing the axis of which is arranged transversely of the axis of said shell and engages with the underside of said upper pin, and lifting means for temporarily lifting said cradle, rollers and upper pivot pin to permit removal of said lower pivot pin.

3. A mounting for a rotary shell having a peripheral bearing surface, comprising a pair of bearing rollers spaced circumferentially and engaging said bearing surface, a cradle upon opposite ends of which said bearing rollers are journaled, a normally stationary supporting base, a universal joint which is interposed between said cradle and base and which includes a lower pivot pin arranged on the base parallel with the axis of said shell, an upper pivot pin arranged on said cradle transversely of the axis of said shell, a universal bearing block provided on its underside with a lower half-bearing the axis of which is arranged parallel with the axis of the shell and engages the upper side of said lower pin and also provided on its upper side with an upper half-bearing the axis of which is arranged transversely of the axis of said shell and engages with the underside of said upper pin and lifting means for temporarily lifting said cradle, rollers and upper pivot pin to permit removal of said lower pivot pin including jack screws mounted on said base and adapted to engage the underside of some of said rollers and the underside of said cradle.

4. A mounting for a rotary shell having a peripheral bearing surface, comprising a pair of bearing rollers spaced circumferentially and engaging said bearing surface, a cradle upon opposite ends of which said bearing rollers are journaled, a normally stationary supporting base, a universal joint which is interposed between said cradle and base and which turns relative to said base about an axis arranged parallel with the axis of said shell and the cradle also turns relative to said base about an axis arranged transversely to the axis of said shell, and means for adjusting said base vertically including a sole plate, a plurality of pairs of cooperating wedges interposed between said base and sole plate, and fastening bolts connecting said base and sole plate.

5. A mounting for a rotary shell having a peripheral bearing surface, comprising a pair of bearing rollers spaced circumferentially and engaging said bearing surface, a cradle upon opposite ends of which said bearing rollers are journaled, a normally stationary supporting base, a universal joint which is interposed between said cradle and base and which turns relative to said base about an axis arranged parallel with the axis of said shell and the cradle also turns relative to said base about an axis arranged transversely to the axis of said shell, and means for adjusting said base vertically including a sole plate, a plurality of pairs of cooperating wedges interposed between said base and sole plate, means for moving the members of each pair of wedges lengthwise relatively to one another including an adjusting screw arranged on one of said wedges, and a nut arranged on the other wedge and receiving said screw, and fastening bolts connecting said base and sole plate.

6. A mounting for a rotary shell having a peripheral bearing surface, comprising a pair of bearing rollers spaced circumferentially and engaging said bearing surface, a cradle upon opposite ends of which said bearing rollers are journaled, a normally stationary supporting base, a universal joint which is interposed between said cradle and base and which turns relative to said base about an axis arranged parallel with the axis of said shell and the cradle also turns relative to said base about an axis arranged transversely to the axis of said shell, and means for adjusting said base vertically including a sole plate, a plurality of pairs of cooperating wedges interposed between said base and sole plate, one of said wedges having a groove and the other wedge having a screw nut which projects into said groove, an adjusting screw mounted on the grooved wedge and working in said screw nut, and fastening bolts connecting said base and sole plate.

7. A mounting for a rotary shell having a peripheral bearing surface, comprising supporting rollers engaging said bearing surface, a cradle upon which said rollers are mounted and which includes side bars and cross bars connecting the side bars, a supporting base, and means for mounting said cradle on said base to permit universal movement of said cradle on said base including an upper trunnion supported at its opposite ends on said cross bar, a lower trunnion arranged at right angles to said upper trunnion and supported at its opposite ends on said base, and a bearing block arranged between said cross bars and having upper and lower bearings arranged perpendicular to one another and engaging respectively with said upper and lower trunnions.

8. A mounting for a rotary shell having a peripheral bearing surface, comprising supporting rollers engaging said bearing surface, a cradle upon which said rollers are mounted and which includes side bars and cross bars connecting the side bars, a supporting base, and means for mounting said cradle on said base to permit universal movement of said cradle on said base including an upper trunnion supported at its opposite ends on said cross bar, a lower trunnion arranged at right angles to said upper trunnion and supported at its opposite ends on said base, and a bearing block arranged between said cross bars and having upper and lower bearings arranged perpendicular to one another and engaging respectively with said upper and lower trunnions, said upper trunnion having shoulders engaging opposite sides of said bearing block.

9. A mounting for a rotary shell having a peripheral bearing surface, comprising supporting rollers engaging said bearing surface, a cradle upon which said rollers are mounted and which includes side bars and cross bars connecting the side bars, a supporting base, and means for mounting said cradle on said base to permit universal movement of said cradle on said base including an upper trunnion supported at its opposite ends on said cross bar, a lower trunnion arranged at right angles to said upper trunnion and supported at its opposite ends on said base, a bearing block arranged between said cross bars and having upper and lower bearings arranged perpendicular to one another and engaging respectively with said upper and lower trunnions, and spacing sleeves arranged on said lower trunnion between opposite sides of the bearing block and said base.

10. A mounting for a rotary shell having a peripheral bearing surface, comprising supporting rollers engaging said bearing surface, a cradle upon which said rollers are mounted and which includes side bars and cross bars connecting the side bars, a supporting base, and means for mounting said cradle on said base to permit universal movement of said cradle on said base including an upper trunnion supported at its opposite ends on said cross bar, a lower trunnion arranged at right angles to said upper trunnion and supported at its opposite ends on said base, a bearing block arranged between said cross bars and having upper and lower bearings arranged perpendicular to one another and engaging respectively with said upper and lower trunnions, and spacing sleeves arranged on said lower trunnion between opposite sides of the bearing block and said base, said cradle side bars being provided with openings which receive said sleeves and the respective parts of the trunnion on which the sleeves are mounted.

11. A mounting for a rotary shell having a peripheral bearing surface, comprising supporting rollers engaging said bearing surface, a cradle upon which said rollers are mounted and which includes side bars and cross bars connecting the side bars, a supporting base, and means for mounting said cradle on said base to permit universal movement of said cradle on said base including an upper trunnion supported at its opposite ends on said cross bar, a lower trunnion arranged at right angles to said upper trunnion and supported at its opposite ends on said base, a bearing block arranged between said cross bars and having upper and lower bearings arranged perpendicular to one another and engaging respectively with said upper and lower trunnions, and a reinforcing web arranged on said cradle and engaging with said lower trunnion.

12. A mounting for a rotary shell having a peripheral bearing surface, comprising supporting rollers engaging said bearing surface, a cradle upon which said rollers are mounted and which includes side bars and cross bars connecting the side bars, a supporting base, and means for mounting said cradle on said base to permit universal movement of said cradle on said base including an upper trunnion supported at its opposite ends on said cross bar, a lower trunnion arranged at right angles to said upper trunnion and supported at its opposite ends on said base, a bearing block arranged between said cross bars and having upper and lower bearings arranged perpendicular to one another and engaging respectively with said upper and lower trunnions, and a reinforcing web comprising a lower section connected with the cradle and an upper section connected with said lower section and engaging with the underside of said lower trunnion.

LEON H. JOHNSON.